(12) United States Patent
Jaeb

(10) Patent No.: US 6,883,662 B2
(45) Date of Patent: Apr. 26, 2005

(54) ADJUSTABLE HOLDING CLIP FOR MEDIA CONTAINER

(75) Inventor: Michael S. Jaeb, Millersburg, OH (US)

(73) Assignee: Nexpak Corporation, Uniontown, OH (US)

( * ) Notice: Subject to any disclaimer, the term of this patent is extended or adjusted under 35 U.S.C. 154(b) by 126 days.

(21) Appl. No.: 10/295,355

(22) Filed: Nov. 15, 2002

(65) Prior Publication Data

US 2003/0111365 A1 Jun. 19, 2003

Related U.S. Application Data

(60) Provisional application No. 60/341,319, filed on Dec. 14, 2001.

(51) Int. Cl.[7] .............................................. B65D 85/57
(52) U.S. Cl. .................... 206/308.1; 206/232
(58) Field of Search ................. 206/215, 232, 206/307.1, 308.1, 477, 478, 480, 482

(56) References Cited

U.S. PATENT DOCUMENTS

| | | | | |
|---|---|---|---|---|
| 4,643,301 A | * | 2/1987 | Hehn et al. | 206/232 |
| 5,445,265 A | * | 8/1995 | Herr et al. | 206/308.1 |
| 5,788,068 A | | 8/1998 | Fraser et al. | |
| 5,996,788 A | | 12/1999 | Belden, Jr. et al. | |
| 6,227,362 B1 | | 5/2001 | Cheung | |
| 6,478,150 B1 | * | 11/2002 | S.o slashed.lling | 206/308.1 |

* cited by examiner

Primary Examiner—David T. Fidei
(74) Attorney, Agent, or Firm—Renner, Otto, Boisselle & Sklar, LLP

(57) ABSTRACT

A literature clip for a media storage container holds thin and thick booklets. In one embodiment, the invention provides a clip that has a first position for thin booklets and a second position for thick booklets. In both of these positions, the clip is resilient to hold booklets of different thicknesses.

15 Claims, 3 Drawing Sheets

ADJUSTABLE HOLDING CLIP FOR MEDIA CONTAINER

CROSS-REFERENCE TO RELATED APPLICATIONS

This application claims priority from U.S. provisional application Ser. No. 60/341,319 filed Dec. 14, 2001; the disclosures of which are incorporated herein by reference.

BACKGROUND OF THE INVENTION

1. Technical Field

The present invention generally relates to media storage containers and, more particularly, to the clips that are used to retain booklets within media storage containers. Specifically, the present invention relates to adjustable holding clips that allow printed literature of substantially different thicknesses to be inserted into the same media storage container.

2. Background Information

Most recorded media is accompanied by materials. The materials may include information related to the media recorded on the tape or disc stored in the container. The materials may include photographs, art, lyrics, or writings related to the recorded media. In the past, the materials were provided in relatively small booklets and could be reproduced on a relatively small number of pages. This resulted in a thin booklet that had to be stored in the storage container.

The relatively thin booklets that typically accompanied recorded media were held in the storage container by flexible clips that had a resting position that was closely adjacent to or directly contacting one of the walls of the storage container. These types of literature clips may be seen in a wide variety of prior art references. For instance, U.S. Pat. No. 6,227,362 discloses literature clips in FIG. 2. In addition, U.S. Pat. No. 5,788,068 discloses literature clips 11A in FIGS. 1 and 2. A further example is disclosed in U.S. Pat. No. 5,996,788 wherein literature clips 26 are disclosed in FIG. 1.

As the popularity of multiple disc sets and DVDs has grown, the materials accompanying the recorded media has correspondingly grown. It is now common to have booklets exceeding 60 pages. Prior art clips that were designed for five to twenty page booklets can be stretched to hold forty to sixty page booklets but become damaged or do not securely hold booklets having over sixty pages. The art thus desires a clip that can hold thin and thick printed booklets.

BRIEF SUMMARY OF THE INVENTION

The invention provides a clip for a media storage container that can hold thin and thick booklets. In one embodiment, the invention provides a clip that has a first position for thin booklets and a second position for thick booklets. In both of these positions, the clip is adjustable to hold booklets of different thicknesses.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
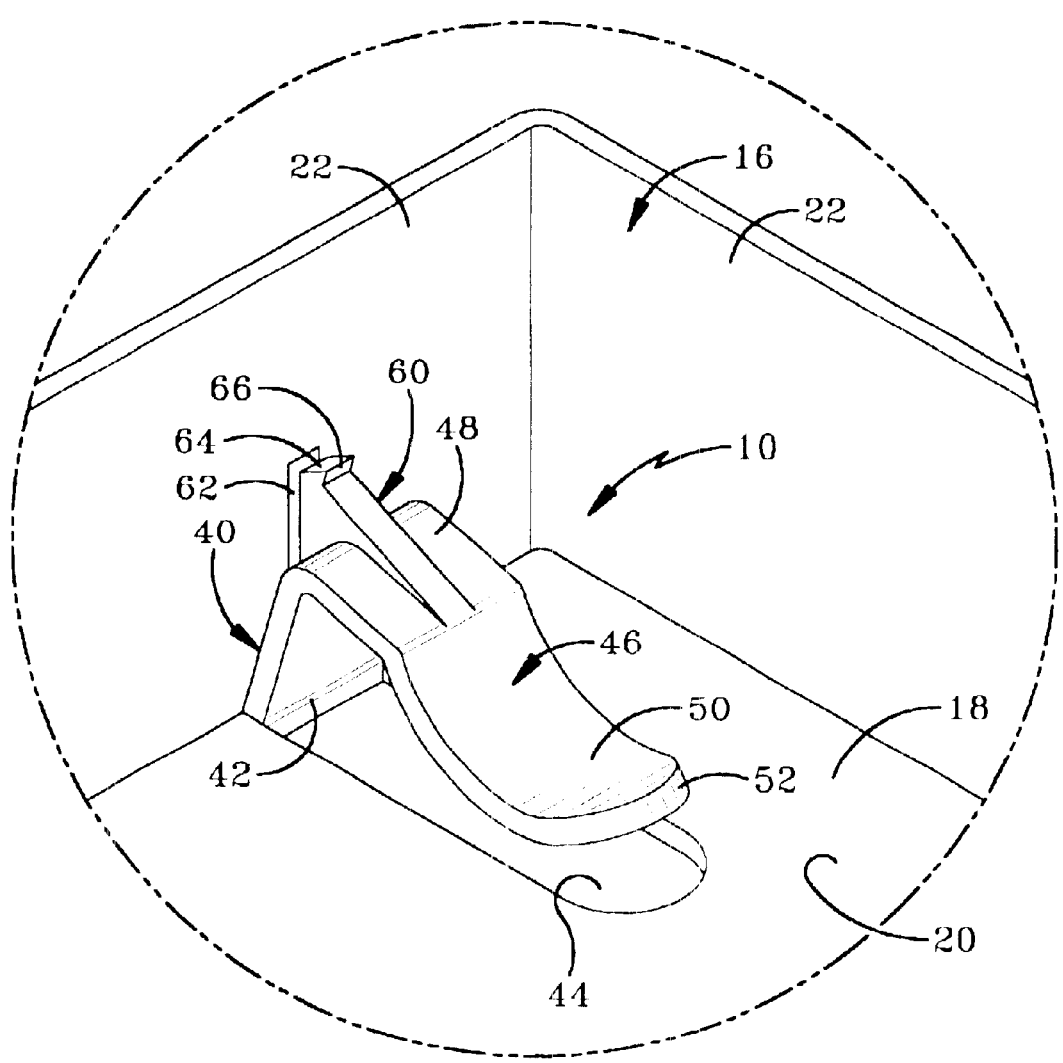
FIG. 1 is a perspective view of the literature clip of the present invention in a first position for thin booklets.
Figure 2:
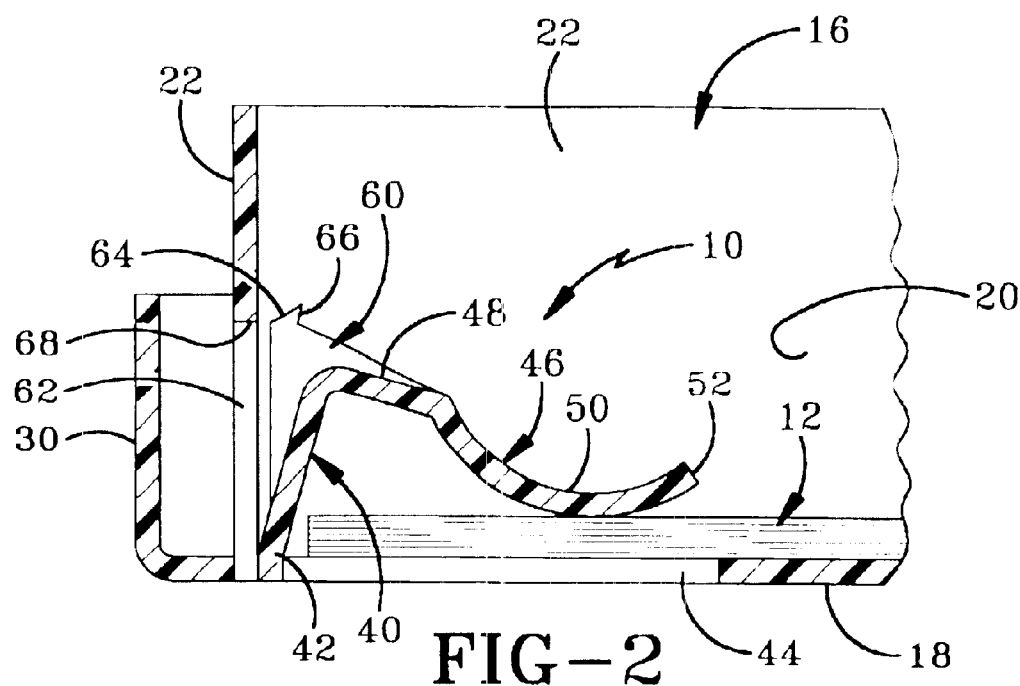
FIG. 2 is a side view of the clip of FIG. 1.

The adjustable clip of the present invention is indicated generally by the numeral 10 in the accompanying drawings. Clip 10 may be positioned in a first position (FIGS. 1 and 2) to hold a relatively thin printed booklet 12 and a second position (FIGS. 3 and 4) to hold a relatively thick printed booklet 14. Clip 10 is designed so that booklets 12 and 14 may be resiliently held by clip 10 so that there is less likelihood that booklets 12 and 14 will fall out of the storage container 16 when the user initially opens storage container 16.

Storage container 16 may be adapted to hold an item of recorded media. The item of recorded media may be any of the variety known in the art and the mechanism for holding the item of media within the container may also vary. Storage container 16 generally includes a wall 18 that forms a portion of the compartment 20 that is designed to receive booklet 12 or 14. Compartment 20 may be bounded by sidewalls 22 that may extend about 1, 2, 3, or 4 sides of compartment 20. In general, holding clips 10 may be used with any two walls disposed at substantially right angles with respect to each other and the walls do not need to be in the same configuration as depicted in the drawings. The embodiment depicted in the drawings is exemplary and provides the best mode now contemplated for achieving the goals of the invention. In other embodiments, wall 18 may be a small portion of container 16 and walls 22 may be disposed at different angles with respect to wall 18.

In the exemplary embodiment of the invention, wall 18 is the top wall portion that defines the lid of storage container 16 and sidewalls 22 define the perimeter walls of the lid. In the exemplary embodiment, container 16 includes a secondary wall 30 disposed outside sidewall 22. Wall 30 is not essential to the concepts of the present invention.

Clip 10 generally includes a first leg 40 that is cantilevered from wall 18 or the bottom of wall 22. First leg 40 may be integrally formed with wall 18 or 22 and may pivot with respect to wall 18 or 22 about a living hinge 42. Living hinge 42 is substantially resilient so that clip 10 has a resting position disposed relatively close to wall 18 so that booklet 12 must force clip 10 upwardly away from wall 18 when booklet 12 is inserted under clip 10. In this embodiment, clip 10 is disposed in a first position that is "relatively close" to wall 18 when clip 10 contacts wall 18, is disposed less than one/eighth inch from wall 18, is disposed exactly one-eighth inch of wall 18, or is disposed below the reference plane formed by wall 18. Clip 10 may be disposed below the reference plane formed by wall 18 when clip 10 is disposed in the opening 44 that is formed in wall 18 when clip 10 is molded.

Clip 10 also includes a second leg 46 that is attached to the outer end of first leg 40 opposite living hinge 42. Second leg 46 may include a first portion 48 and a second portion 50 with second portion 50 being curved. The curved nature of second portion 50 allows booklet 12 to be readily slipped under clip 10 and increases the adjustability of clip 10 by allowing the contact point between clip 10 and booklet 12 to move along second arm 46 as the thickness of booklet 12 increases and decreases. For instance, a thin booklet 12 will contact second arm 46 closer to the outer end 52 of second arm than a thicker booklet 12.

Figure 4:
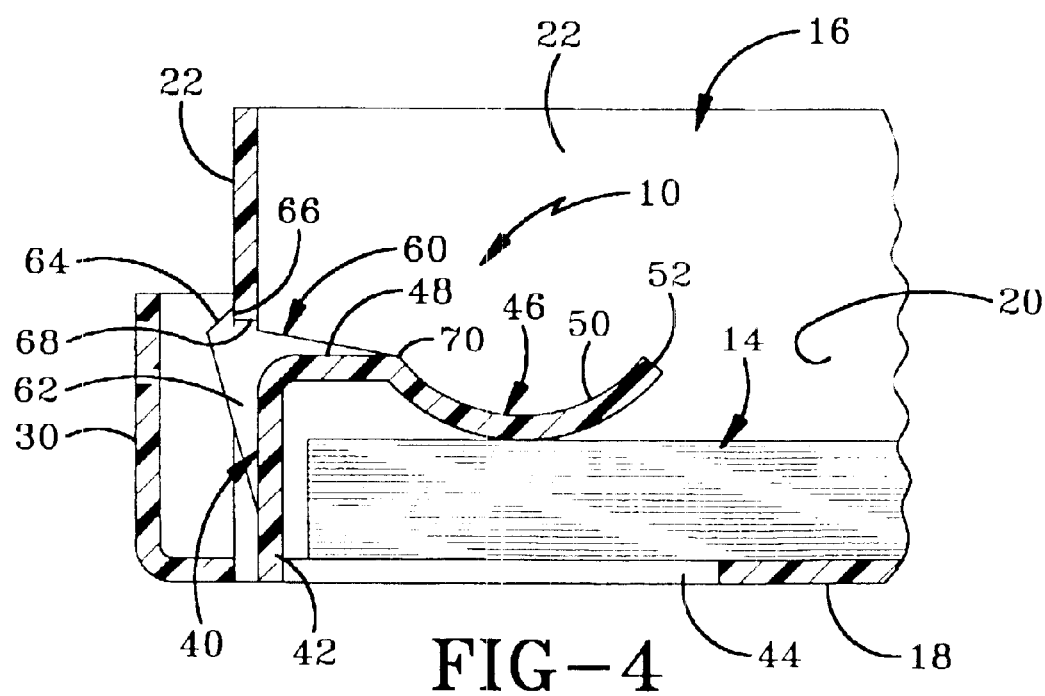
FIG. 4 is a side view of the clip of FIG. 3.
Figure 3:
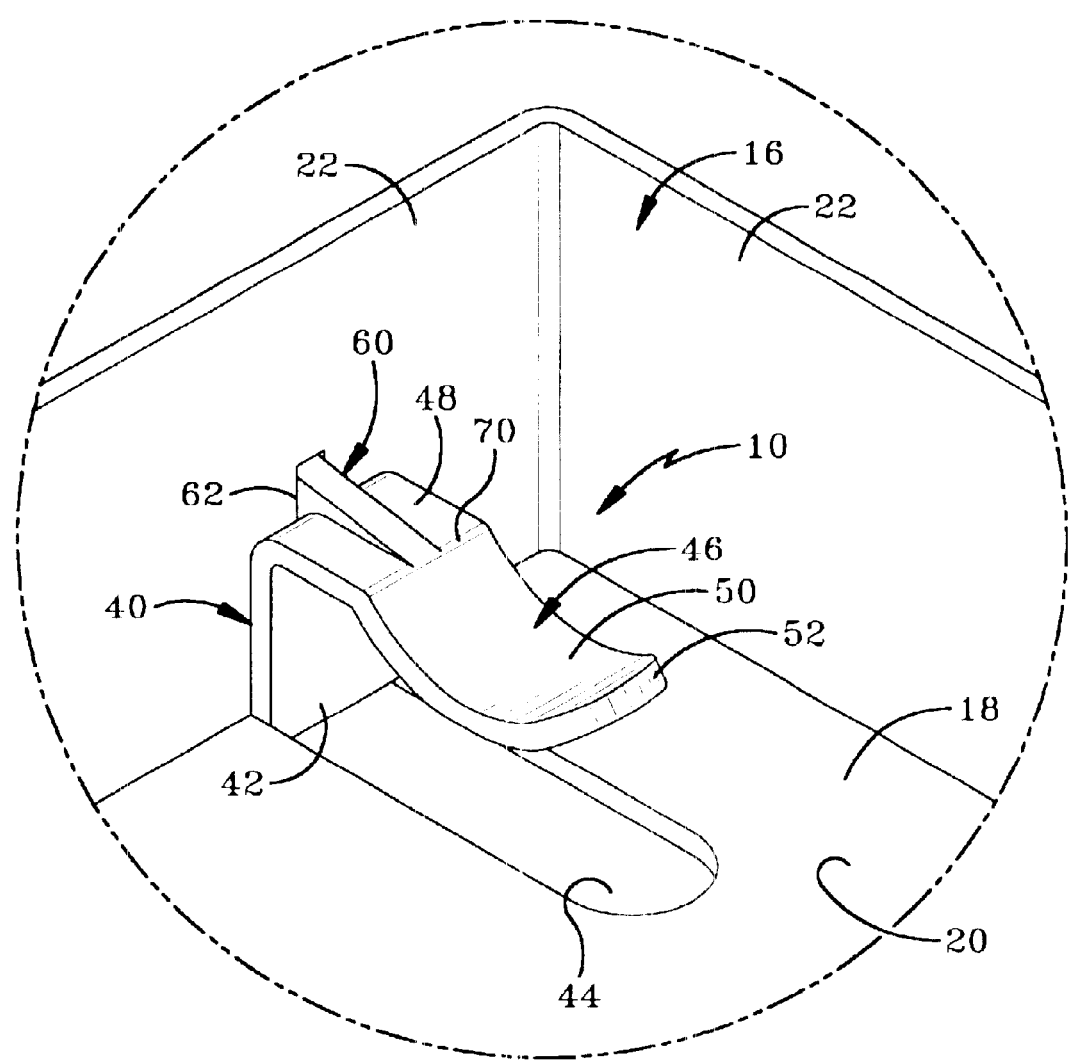
FIG. 3 is a perspective view of the clip of the present invention in a second position for holding relatively thick booklets.

Clip 10 further includes a latch 60 that is configured to engage container 16 to position clip 10 in the second position as depicted in FIGS. 3 and 4. As explained above, the second position of clip 10 positions clip 10 to resiliently hold thicker booklets 13. In the exemplary embodiment, clip 10 is spaced over one-eighth inch from wall 18 when clip 10 is in the second position. In the preferred embodiment, clip 10 is positioned a quarter inch from wall 18 when in the second position.

Latch 60 is configured to pass through an opening 62 formed in a wall of container 16 in a one-way, snap-fit locking configuration to hold clip 10 in the second position. To facilitate this locking configuration, latch 60 includes an angled wall portion 64 and a locking wall portion 66. Angled wall portion 64 rides along the edge 68 of container 16 that defines opening 62 with locking wall portion 66 engaging container 16 to prevent latch 60 from moving back to an unlatched condition. In the exemplary embodiment, opening 62 is defined by sidewall 22. In other embodiments, opening 62 may be defined by wall 18, wall 30, or an additional protrusion connected to container 16.

Latch 60 may thus be locked into the second position when the user of container 16 desires to store a thick booklet (14) in container 16. When clip 10 is locked in the second position, living hinge 70 disposed between portions 48 and 50 provides the resilient force to hold booklet 14 because first arm 40 of clip 10 is locked in place. The stiffness of living hinge 70 may be adjusted to properly hold booklet 14.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A media storage container comprising:
   a body;
   a literature clip attached to the body;
   the literature clip movable from a first position to a second position;
   the literature clip adapted to resiliently hold a literature booklet having a first thickness in the first position and a literature booklet having a second thickness in the second position;
   the second thickness being larger than the first thickness; and the literature clip including a latch that connects the clip to the body when the clip is in the second position.

2. The container of claim 1, wherein the body includes first and second walls disposed substantially perpendicular to each other; the clip being cantilevered over the first wall.

3. The container of claim 2, wherein the latch connects the clip to the second wall when the clip is in the second position.

4. The container of claim 1, wherein the clip includes a curved portion.

5. The container of claim 1, wherein the literature clip includes a first portion cantilevered from the body; the literature clip including a second portion cantilevered from the first portion.

6. The container of claim 1, wherein the body defines an opening that lockingly receives the latch when the clip is in the second position.

7. A media storage container comprising:
   a body and a literature holding clip;
   the literature holding clip moveable between a first position and a second position;
   the literature holding clip being connected to the body at a first location; and
   the literature holding clip being connected to the body in two spaced apart locations when in the second position; and
   the literature clip including a latch that connects the clip to the body when the clip is in the second position.

8. The container of claim 7, wherein the body includes first and second walls disposed substantially perpendicular to each other; the clip being cantilevered over the first wall.

9. The container of claim 8, wherein the latch connects the clip to the second wall when the clip is in the second position.

10. The container of claim 7, wherein the literature clip includes a first portion cantilevered from the body; the literature clip including a second portion cantilevered from the first portion.

11. The container of claim 7, wherein the body defines an opening that lockingly receives the latch when the clip is in the second position.

12. The container of claim 7, wherein the literature clip is cantilevered over a portion of the body in both of the first and second positions; the clip being spaced from the portion of the body a first distance in the first position and a second distance in the second position; the second distance being greater than the first distance.

13. The container of claim 12, wherein the literature clip adapted to resiliently hold a literature booklet having a first thickness in the first position and a literature booklet having a second thickness in the second position.

14. The container of claim 13, wherein the container is adapted to hold an item of recorded media.

15. A media storage container comprising:
   a body defining a compartment adapted to hold a literature booklet;
   a literature clip attached to the body;
   the literature clip movable from a first position to a second position;
   the literature clip adapted to resiliently hold a literature booklet having a first thickness in the first position and a literature booklet having a second thickness in the second position;
   the second thickness being larger than the first thickness; and
   the literature clip including a latch that locks the literature clip to the body when the literature clip is in the second position.

* * * * *